US012643555B2

(12) United States Patent
Tu et al.

(10) Patent No.: US 12,643,555 B2
(45) Date of Patent: Jun. 2, 2026

(54) ELECTRIC VEHICLE ENERGY MANAGEMENT METHOD BASED ON BEND PREDICTION, TERMINAL DEVICE, AND STORAGE MEDIUM

(71) Applicant: Xiamen Yaxon Zhilian Technology Co., Ltd., Xiamen (CN)

(72) Inventors: Yankai Tu, Xiamen (CN); Junfang Lai, Xiamen (CN); Xuhui Ye, Xiamen (CN); Tengyuan Luo, Xiamen (CN); Hui Li, Xiamen (CN)

(73) Assignee: Xiamen Yaxon Zhilian Technology Co., Ltd., Xiamen (CN)

( * ) Notice: Subject to any disclaimer, the term of this patent is extended or adjusted under 35 U.S.C. 154(b) by 454 days.

(21) Appl. No.: 18/254,119

(22) PCT Filed: Jul. 23, 2021

(86) PCT No.: PCT/CN2021/108062
§ 371 (c)(1),
(2) Date: May 23, 2023

(87) PCT Pub. No.: WO2022/110849
PCT Pub. Date: Jun. 2, 2022

(65) Prior Publication Data
US 2024/0025422 A1    Jan. 25, 2024

(30) Foreign Application Priority Data

Nov. 27, 2020    (CN) .......................... 202011355461.2

(51) Int. Cl.
*B60W 50/00*          (2006.01)
*B60W 30/18*          (2012.01)
(Continued)

(52) U.S. Cl.
CPC .. *B60W 50/0097* (2013.01); *B60W 30/18127* (2013.01); *B60W 30/18145* (2013.01);
(Continued)

(58) Field of Classification Search
CPC ....... B60W 50/0097; B60W 30/18127; B60W 30/18145; B60W 30/18172;
(Continued)

(56) References Cited

U.S. PATENT DOCUMENTS

| | | | | |
|---|---|---|---|---|
| 2011/0082632 A1* | 4/2011 | Rowker | ................ | B60W 10/08 340/453 |
| 2015/0336458 A1 | 11/2015 | Lee et al. | | |
| 2020/0307384 A1* | 10/2020 | Mendez Pineda | ...... | B60L 50/60 |

FOREIGN PATENT DOCUMENTS

| | | |
|---|---|---|
| CN | 104290747 A | 1/2015 |
| CN | 104890527 A | 9/2015 |

(Continued)

OTHER PUBLICATIONS

International Search Report cited in PCT/CN2021/108062 mailed Oct. 15, 2021, 6 pages.

(Continued)

*Primary Examiner* — Jacob S. Scott
*Assistant Examiner* — Michael E Butler
(74) *Attorney, Agent, or Firm* — COOPER LEGAL GROUP LLC

(57)          ABSTRACT

The present disclosure relates to an electric vehicle energy management method based on bend prediction, a terminal device, and a storage medium. The method includes the following steps: S1. counting an average acceleration $a_v$ of vehicle decelerations; S2. acquiring bend information of a road ahead by an e-horizon system; S3. predicting energy recovery amount during cornering based on the bend information and a maximum cornering speed of a vehicle; and (Continued)

S4. adjusting a logic threshold value for current driving based on the predicted energy recovery amount. With the method of the present disclosure, a supercapacitor can output more energy in advance based on energy likely to be recovered during cornering ahead, so as to free up energy recovery space and to recover energy during cornering, which can reduce power output of a battery, ensure energy recovery, and play a positive role in loss reduction and energy-saving control.

9 Claims, 1 Drawing Sheet

(51) Int. Cl.
    *B60W 40/105*        (2012.01)
    *B60W 40/107*        (2012.01)
    *B60W 40/109*        (2012.01)

(52) U.S. Cl.
    CPC .... *B60W 30/18172* (2013.01); *B60W 40/105* (2013.01); *B60W 40/107* (2013.01); *B60W 40/109* (2013.01); *B60W 2552/30* (2020.02)

(58) Field of Classification Search
    CPC ............. B60W 40/107; B60W 40/105; B60W 40/109; B60W 2552/30

USPC .................................................... 701/22, 70
See application file for complete search history.

(56) References Cited

FOREIGN PATENT DOCUMENTS

| | | | | |
|---|---|---|---|---|
| CN | 108367751 A | | 8/2018 | |
| CN | 108512239 A | | 9/2018 | |
| CN | 111186429 | * | 5/2019 | ....... G08G 1/096827 |
| CN | 110936947 A | | 3/2020 | |
| CN | 113942396 | * | 12/2024 | ................ B60L 7/10 |
| GB | 2572448 | * | 10/2019 | ...... G60W 30/18154 |
| JP | 2008143483 | * | 6/2008 | ............. Y02T 10/62 |
| JP | 2013102601 | * | 5/2013 | ............. Y02T 10/72 |
| JP | 2019088114 | * | 6/2019 | ............. Y02T 10/62 |
| WO | WO-2012004842 A1 | * | 1/2012 | ............. G08G 1/166 |

OTHER PUBLICATIONS

Written Opinion cited in PCT/CN2021/108062 mailed Oct. 15, 2021, 3 pages.

* cited by examiner

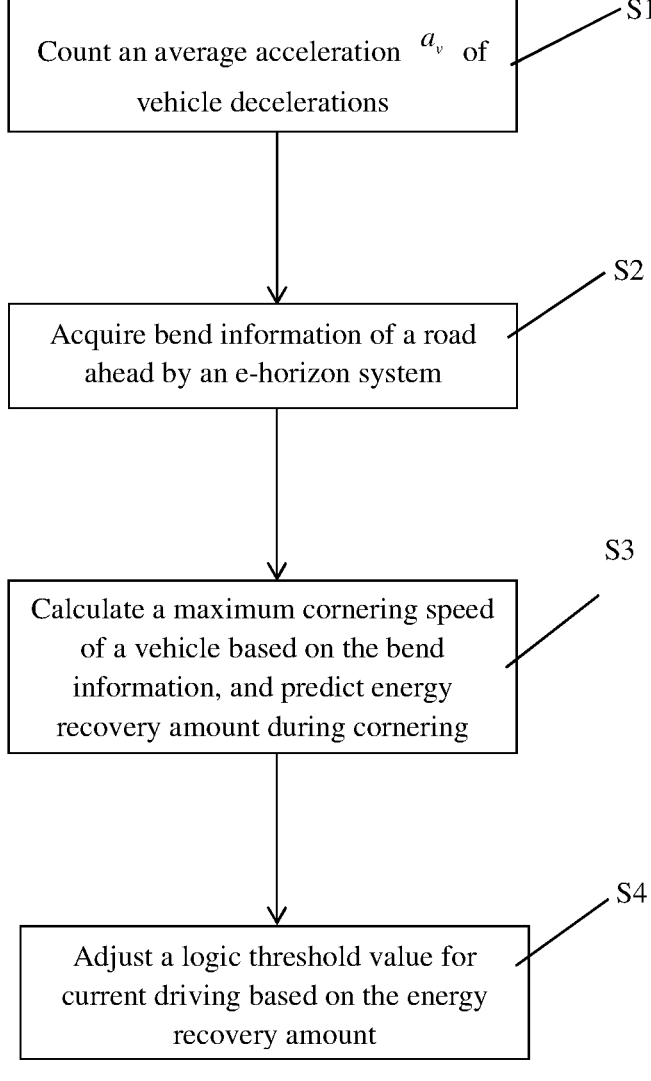

ELECTRIC VEHICLE ENERGY MANAGEMENT METHOD BASED ON BEND PREDICTION, TERMINAL DEVICE, AND STORAGE MEDIUM

TECHNICAL FIELD

The present disclosure relates to the field of electric vehicles, in particular to an electric vehicle energy management method based on bend prediction, a terminal device, and a storage medium.

BACKGROUND

An energy system of a modern pure electric vehicle is generally a B+C (B=power battery, C=supercapacitor) system. Energy recovery is firstly done by a supercapacitor with higher charging and discharging efficiency, while in energy output management, a traditional method is an energy management strategy based on logic threshold rules, that is, a power output demand below a logic threshold is provided by a lithium battery, and a power output demand over the logic threshold is provided by the supercapacitor. In this way, the characteristic that the supercapacitor is suitable for fast charging and discharging may be fully used, the lithium battery is effectively protected, and the service life of the lithium battery is prolonged. However, traditional energy management methods are generally not predictive, that is, energy management is not optimized in advance based on road conditions ahead of the vehicle. Therefore, although the logic threshold rules or other traditional energy management methods are often applicable at present, they are not necessarily optimal for future road conditions.

SUMMARY

The present disclosure aims to provide an electric vehicle energy management method based on bend prediction, a terminal device, and a storage medium to solve the above-mentioned problems. Therefore, the specific technical solutions adopted by the present disclosure are as follows:

According to one aspect of the present disclosure, an electric vehicle energy management method based on bend prediction is provided. The method includes the following steps:

S1. counting an average acceleration $a_v$ of vehicle decelerations;

S2. acquiring bend information of a road ahead by an e-horizon system;

S3. calculating a maximum cornering speed of a vehicle based on the bend information, and predicting energy recovery amount during cornering; and S4. adjusting a logic threshold value for current driving based on the energy recovery amount.

Further, step S3 specifically includes:

S31. calculating the maximum cornering speed $v_s = \sqrt{\mu g R}$ of the vehicle, where R denotes a radius of curvature of a bend, $\mu$ denotes a road friction coefficient, and g denotes the acceleration of gravity; and S32. predicting the energy recovery amount $\lambda E$ during cornering, where E denotes kinetic energy $$E = \frac{1}{2}m\left(v_0^2 - v_s^2\right)$$

reduced by decreasing a current vehicle speed $v_0$ to the maximum cornering speed $v_s$, $\lambda$ denotes an energy recovery coefficient, and m denotes vehicle mass.

Further, $\lambda$ ranges from 0.4 to 0.6.

Further, step S4 specifically includes:

S41. calculating a distance $$D_2 = \frac{v_0^2 - v_s^2}{2a_v}$$

between a position where the deceleration theoretically starts and a turn-in point, $v_0$ denoting the current vehicle speed;

S42. calculating travel time $$t = \frac{D - D_2}{v_0}$$

of the vehicle traveling to a deceleration point before the vehicle enters the bend, taking $\lambda$ as an average value of 0.5, and estimating output power $$P = \frac{\lambda E - E_r}{t} = \frac{\lambda v_0 m\left(v_0^2 - v_s^2\right) - 2v_0 E_r}{2(D - D_2)}$$

capable of being increased by a supercapacitor before the vehicle enters the bend, $E_r$ denoting remaining storable energy of the supercapacitor, D denoting a distance between the current vehicle and the turn-in point; and S43. adjusting a logic threshold of the vehicle from D meters before the turn-in point to D2 meters before the turn-in point to $P_L - P$, wherein $P_L$ is a conventional fixed logic threshold.

Further, step S1 specifically includes: recording an acceleration $a_i$ of an ith vehicle deceleration based on a braking signal of the vehicle, and counting the average acceleration $$a_v = \frac{1}{n}\sum_{i=1}^{n}a_i$$

of the vehicle decelerations, where $n \geq 30$.

According to another aspect of the present disclosure, a terminal device is further provided. The terminal device includes a memory, a processor, and a computer program stored on the memory and capable of running on the processor, and the processor, when executing the computer program, implements the steps of the above-mentioned method.

According to yet another aspect of the present disclosure, a computer-readable storage medium is further provided. The computer-readable storage medium has a computer program stored thereon, and the computer program, when executed by a processor, implements the steps of the above-mentioned method.

By the adoption of the above technical solutions, the present disclosure has the following beneficial effects: With the method of the present disclosure, the supercapacitor can output more energy in advance based on energy likely to be recovered during cornering ahead, so as to free up energy recovery space and to recover energy during cornering, which can reduce power output of a battery, ensure energy recovery, and play a positive role in loss reduction and energy-saving control.

BRIEF DESCRIPTION OF DRAWINGS

To further illustrate the embodiments, the present disclosure is provided with accompanying drawings. The accompanying drawings are part of the present disclosure, are intended primarily to illustrate the embodiments, and may, together with relevant description of the specification, serve to explain the principles of operation of the embodiments. With these references in mind, a person of ordinary skill in the art will appreciate other possible embodiments and advantages of the present disclosure. Elements in the figures are not drawn to scale, and like reference numerals are generally used to indicate like elements.

FIG. 1 is a flow diagram of an electric vehicle energy management method based on bend prediction according to the present disclosure.

DESCRIPTION OF EMBODIMENTS

The present disclosure will now be further illustrated with reference to the accompanying drawings and the detailed description.

As shown in FIG. 1, an electric vehicle energy management method based on bend prediction includes the following steps:

S1. Count an average acceleration $a_v$ of vehicle decelerations. Specifically, an acceleration $a_i$ of an ith vehicle deceleration is recorded based on a braking signal of a vehicle, and the average acceleration $$a_v = \frac{1}{n}\sum_{i=1}^{n} a_i$$

of the vehicle decelerations is counted, where n≥30.

S2. Acquire bend information of a road ahead by an e-horizon system.

S3. Calculate a maximum cornering speed of the vehicle based on the bend information, and predict energy recovery amount during cornering. The step specifically includes:

S31. Calculate the maximum cornering speed $v_s$ of the vehicle. The maximum cornering speed (also referred to as a limit sideslip speed) $v_s$ is calculated based on a formula $v_s = \sqrt{\mu g R}$, which means that a safe speed should be at least below $v_s$ when driving through a bend, otherwise the vehicle may skid, where μ denotes a road friction coefficient and is a constant, and g denotes the acceleration of gravity.

S32. Predict the energy recovery amount during cornering. When the vehicle turns the corner, the current vehicle speed $v_0$ may be reduced to be at least below the limit sideslip speed $v_s$, so the kinetic energy that may be reduced during cornering relative to the current vehicle speed state of the vehicle is predicted to be at least $$E = \frac{1}{2}m(v_0^2 - v_s^2).$$

According to related literature about braking energy recovery, the efficiency of energy recovery (i.e., an energy recovery coefficient λ) is about 0.4-0.6 at the average braking intensity, and an average value is about 0.5. Therefore it is roughly estimated that the reduced kinetic energy may be converted into electrical energy recovery of about 0.5 E.

A current state of a supercapacitor is obtained, so remaining storable energy $E_r$ of the supercapacitor is obtained (a known method is to perform conversion from an SOC state of the supercapacitor). If $E_r < 0.5$ E, it means that the remaining space of the supercapacitor may not be enough to recover energy which may be recovered due to braking before the vehicle enters a bend.

S4: Adjust a logic threshold value for current driving based on the predicted energy recovery amount. The step specifically includes:

S41. Calculate a distance $D_2$ between a position where the deceleration theoretically starts and a turn-in point as:

$$D_2 = \frac{v_0^2 - v_s^2}{2a_v},$$

indicating that in a case of D2 from the turn-in point, at least the maximum cornering speed $v_s$ is required for deceleration from the current vehicle speed $v_0$ to the vehicle speed when the vehicle enters the bend at the average acceleration $a_v$.

S42. Ideally, completely recover the kinetic energy reduced for achieving safe cornering by the supercapacitor, which is the most economical. The travel time of the vehicle traveling to a deceleration point before the vehicle enters the bend is $$t = \frac{D - D_2}{v_0},$$

and it is estimated that output power capable of being increased by the supercapacitor before the vehicle enters the bend is $$P = \frac{0.5E - E_r}{t} = \frac{v_0 m(v_0^2 - v_s^2) - 4v_0 E_r}{4(D - D_2)}.$$

S43. Assuming that a conventional fixed logic threshold is $P_L$, adjust a logic threshold of the vehicle within a distance from D meters before the turn-in point to $D_2$ meters before the turn-in point to $P_L - P$. In this way, more energy can be output by the supercapacitor before the vehicle enters the bend, which not only reduces the discharge of a power battery, but also makes the supercapacitor free up approximately enough space to recover the energy for bend deceleration, thereby not only protecting the power battery, but also achieving good energy consumption economical efficiency of the whole vehicle.

According to the present disclosure, the radius of curvature of the bend ahead is acquired based on the e-horizon system, and a predictive dynamic logic threshold value is generated, so that the defect that a traditional fixed logic threshold value does not have predictive optimal energy management is overcome. An energy management system performs predictive energy management through energy management strategies based on the predictive dynamic logic threshold value, which plays a positive role in reducing energy consumption of electric vehicles, preventing battery loss, improving the economical efficiency of the vehicles, etc.

An embodiment of the present disclosure further provides a terminal device. The terminal device includes a memory, a processor, and a computer program stored on the memory and capable of running on the processor. The processor, when executing the computer program, implements steps S1-S4 of the above-mentioned method.

Further, the terminal device may be a desktop computer, a laptop, a palm computer, a cloud server and other computing devices. The terminal device may include, but is not limited to, a processor and a memory. A person skilled in the art may appreciate that the above composition structure of the terminal device is only an example of the terminal device and does not constitute a limitation on the terminal device. The terminal device may include more or less components than the above, or a combination of some components, or different components, for example, the terminal device may also include input and output devices, network access devices, buses, etc., which are not limited by the embodiments of the present disclosure.

Further, the processor may be a central processing unit (CPU), or other general purpose processors, digital signal processors (DSPs), application specific integrated circuits (ASICs), field-programmable gate arrays (FPGAs) or other programmable logic devices, discrete gates or transistor logic devices, discrete hardware components, etc. The general purpose processors may be a microprocessor or any conventional processor, etc. The processor is a control center of the terminal device, and is connected to each part of the entire terminal device via various interfaces and lines.

The memory may be used for storing the computer programs and/or modules, and the processor implements various functions by running or executing the computer programs and/or modules stored in the memory and by invoking data stored in the memory. The memory may primarily include a program storage region and a data storage region. The program storage region may store an operating system, and applications required for at least one function. In addition, the memory may include a high-speed random access memory, or a non-volatile memory, such as a hard disk, an internal memory, a plug-in hard disk, a smart media card (SMC), a secure digital (SD) card, a Flash card, at least one disk memory device, a flash memory device, or other volatile solid-state memory devices.

An embodiment of the present disclosure further provides a computer-readable storage medium. The computer-readable storage medium has a computer program stored thereon, and the computer program, when executed by a processor, implements the steps S1-S4 of the above method according to the embodiment of the present disclosure.

The integrated modules/units of the terminal device may be stored in a computer-readable storage medium if they are implemented in the form of software functional units and sold or used as stand-alone products. Based on such understanding, the present disclosure may also implement all or part of the processes in steps S1-S4 of the method in the above embodiment by instructing relevant hardware by means of a computer program. The computer program may be stored in a computer-readable storage medium, and the computer program, when executed by a processor, may implement the steps of each of the above method embodiments. The computer program includes a computer program code, and the computer program code may be in a form of source code, object code, executable file or some intermediate forms. The computer-readable medium may include: any entity or device capable of carrying the computer program code, a recording medium, a USB flash drive, a mobile hard disk drive, a diskette, a compact disk, a computer memory, a read-only memory (ROM), a random access memory (RAM), an electrical carrier signal, a telecommunication signal, and a software distribution medium, etc. It should be noted that the computer-readable medium may contain content which is subject to appropriate additions and subtractions as required by legislation and patent practice in jurisdictions, for example, in some jurisdictions, the computer-readable medium does not include the electrical carrier signal or the telecommunication signal in accordance with legislation and patent practice.

While the present disclosure has been particularly illustrated and described with references to the preferred embodiments, it will be understood by a person skilled in the art that all changes in form and details made to the present disclosure without departing from the spirit and scope of the present disclosure as defined by the appended claims fall within the protection scope of the present disclosure.

The invention claimed is:

1. An electric vehicle energy management method based on bend prediction, comprising the following steps:

S1, counting, by a processor, an average acceleration $a_v$ of vehicle decelerations;

S2, acquiring, by the processor, bend information of a road ahead from an e-horizon system;

S3, calculating, by the processor, a maximum cornering speed of a vehicle based on the bend information, and predicting an energy recovery amount during cornering; and S4, adjusting, by the processor, a logic threshold value for current driving based on the energy recovery amount;

wherein the step S1 comprises: recording an acceleration $a_i$ of an ith vehicle deceleration based on a braking signal of the vehicle, and counting the average acceleration $$a_v = \frac{1}{n}\sum_{i=1}^{n} a_i$$

of the vehicle decelerations, wherein $n \geq 30$.

2. The method according to claim 1, wherein the step S3 comprises:

S31, calculating the maximum cornering speed $v_s = \sqrt{\mu g R}$ of the vehicle, wherein R denotes a radius of curvature of a bend, $\mu$ denotes a road friction coefficient of the bend, and g denotes an acceleration of gravity; and S32, predicting the energy recovery amount $\lambda E$ during cornering, wherein E denotes kinetic energy $$E = \frac{1}{2}m\left(v_0^2 - v_s^2\right)$$

reduced by decreasing a current vehicle speed $v_0$ to the maximum cornering speed $v_s$, $\lambda$ denotes an energy recovery coefficient, and m denotes vehicle mass.

3. The method according to claim 2, wherein $\lambda$ ranges from 0.4 to 0.6.

4. The method according to claim 2, wherein the step S4 comprises:

S41, calculating a distance $$D_2 = \frac{v_0^2 - v_s^2}{2a_v}$$

between a position where deceleration theoretically starts and a turn-in point;

S42, calculating travel time $$t = \frac{D - D_2}{v_0}$$

of the vehicle traveling to a deceleration point before the vehicle enters the bend, taking $\lambda$ as an average value of 0.5, and estimating output power $$P = \frac{\lambda E - E_r}{t} = \frac{\lambda v_0 m(v_0^2 - v_s^2) - 2v_0 E_r}{2(D - D_2)}$$

capable of being increased by a supercapacitor before the vehicle enters the bend, $E_r$ denoting remaining storable energy of the supercapacitor, D denoting a distance between the vehicle and the turn-in point; and S43, adjusting a logic threshold of the vehicle from D meters before the turn-in point to D2 meters before the turn-in point to $P_L$–P, wherein $P_L$ is a fixed logic threshold.

5. A terminal device, comprising a memory, the processor, and a computer program stored on the memory and configured to run on the processor, wherein the processor, when executing the computer program, implements the steps of the method according to claim 1.

6. A non-transitory computer-readable storage medium having a computer program stored thereon, wherein the computer program, when executed by the processor, implements the steps of the method according to claim 1.

7. An electric vehicle energy management method based on bend prediction, comprising the following steps:

S1, counting, by a processor, an average acceleration $a_v$ of vehicle decelerations;

S2, acquiring, by the processor, bend information of a road ahead from an e-horizon system;

S3, calculating, by the processor, a maximum cornering speed of a vehicle based on the bend information, and predicting an energy recovery amount during cornering; and S4, adjusting, by the processor, a logic threshold value for current driving based on the energy recovery amount;

wherein the step S3 comprises:

S31, calculating the maximum cornering speed $v_s = \sqrt{\mu g R}$ of the vehicle, wherein R denotes a radius of curvature of a bend, u denotes a road friction coefficient of the bend, and g denotes an acceleration of gravity; and S32, predicting the energy recovery amount $\lambda E$ during cornering, wherein E denotes kinetic energy $$E = \frac{1}{2}m(v_0^2 - v_s^2)$$

reduced by decreasing a current vehicle speed $v_0$ to the maximum cornering speed $v_s$, $\lambda$ denotes an energy recovery coefficient, and m denotes vehicle mass.

8. The method according to claim 7, wherein $\lambda$ ranges from 0.4 to 0.6.

9. The method according to claim 7, wherein the step S4 comprises:

S41, calculating a distance $$D_2 = \frac{v_0^2 - v_s^2}{2a_v}$$

between a position where deceleration theoretically starts and a turn-in point;

S42, calculating travel time $$t = \frac{D - D_2}{v_0}$$

of the vehicle traveling to a deceleration point before the vehicle enters the bend, taking $\lambda$ as an average value of 0.5, and estimating output power $$P = \frac{\lambda E - E_r}{t} = \frac{\lambda v_0 m(v_0^2 - v_s^2) - 2v_0 E_r}{2(D - D_2)}$$

capable of being increased by a supercapacitor before the vehicle enters the bend, $E_r$ denoting remaining storable energy of the supercapacitor, D denoting a distance between the vehicle and the turn-in point; and S43, adjusting a logic threshold of the vehicle from D meters before the turn-in point to D2 meters before the turn-in point to $P_L$–P, wherein $P_L$ is a fixed logic threshold.

\* \* \* \* \*